(12) United States Patent
Kim et al.

(10) Patent No.: US 9,919,576 B2
(45) Date of Patent: Mar. 20, 2018

(54) AIR CONDITIONER FOR VEHICLE AND CONTROLLING METHOD THEREOF

(71) Applicant: Halla Visteon Climate Control Corp., Daejeon (KR)

(72) Inventors: Taewan Kim, Daejeon (KR); Sangho Oh, Daejeon (KR); Taeyun Kong, Daejeon (KR); Inhyeok Kim, Daejeon (KR); Jeonghun Seo, Daejeon (KR); Yongeun Seo, Daejeon (KR)

(73) Assignee: Hanon Systems, Daejeon (KR)

( * ) Notice: Subject to any disclaimer, the term of this patent is extended or adjusted under 35 U.S.C. 154(b) by 68 days.

(21) Appl. No.: 14/760,888

(22) PCT Filed: Aug. 22, 2014

(86) PCT No.: PCT/KR2014/007829
§ 371 (c)(1),
(2) Date: Jul. 14, 2015

(87) PCT Pub. No.: WO2015/026198
PCT Pub. Date: Feb. 26, 2015

(65) Prior Publication Data
US 2016/0152110 A1   Jun. 2, 2016

(30) Foreign Application Priority Data

Aug. 22, 2013 (KR) .................. 10-2013-0099428
Sep. 2, 2013 (KR) .................. 10-2013-0104631

(51) Int. Cl.
*B60H 1/00* (2006.01)
(52) U.S. Cl.
CPC ....... *B60H 1/00028* (2013.01); *B60H 1/0005* (2013.01); *B60H 1/00057* (2013.01);
(Continued)

(58) Field of Classification Search
CPC ............. B60H 1/00028; B60H 1/0005; B60H 1/00057; B60H 1/00207; B60H 1/00564; B60H 1/00664
(Continued)

(56) References Cited

U.S. PATENT DOCUMENTS 2,056,980 A * 10/1936 Owen ................ B60H 1/00007
165/202
2,203,477 A * 6/1940 Wahlberg ........... B60H 1/00042
165/202
(Continued)

FOREIGN PATENT DOCUMENTS

JP           09-109652         4/1997
KR      10-2010-0094717        8/2010
(Continued)

*Primary Examiner* — Ljiljana Ciric
(74) *Attorney, Agent, or Firm* — Norton Rose Fulbright US LLP

(57) ABSTRACT

An air conditioner for a vehicle and a method of controlling the air conditioner to variably control a position of a rear seat cold air control door depending on a position of a front seat temperature-adjusting door. The position of the rear seat cold air control door is controlled according to rear seat air-conditioning modes (rear seat temperature-adjusting modes). In an air-conditioning case, the rear seat cold air control door is mounted on a rear seat air passageway, thereby distributing an optimal volume of cold air to the front seat air passageway and the rear seat air passageway by preventing a large volume of cold air from being supplied to the rear seat air passageway in the rear seat temperature-adjusting mode, securing linearity of temperature discharged to the rear seat.

9 Claims, 12 Drawing Sheets

(52) U.S. Cl.
CPC ..... *B60H 1/00207* (2013.01); *B60H 1/00564* (2013.01); *B60H 1/00664* (2013.01); *B60H 2001/002* (2013.01); *B60H 2001/00092* (2013.01); *B60H 2001/00185* (2013.01)

(58) Field of Classification Search
USPC .......................................... 165/202, 203, 204
See application file for complete search history.

(56) References Cited

U.S. PATENT DOCUMENTS

| | | | | |
|---|---|---|---|---|
| 2,476,295 A * | 7/1949 | Hans | ................. | B60H 1/00371 165/203 |
| 4,681,153 A * | 7/1987 | Uchida | ............. | B60H 1/00842 165/103 |
| 5,199,485 A * | 4/1993 | Ito | ..................... | B60H 1/00007 165/203 |
| 6,131,652 A * | 10/2000 | Ito | ..................... | B60H 1/00064 165/203 |
| 6,148,904 A * | 11/2000 | Tsunooka | ........... | B60H 1/00064 165/204 |
| 6,202,934 B1 * | 3/2001 | Kamiya | ............. | B60H 1/00735 165/204 |
| 6,230,795 B1 * | 5/2001 | Tsunooka | ........... | B60H 1/00064 165/203 |
| 6,244,335 B1 * | 6/2001 | Nakamura | ......... | B60H 1/00028 165/203 |
| 6,247,530 B1 * | 6/2001 | Mochizuki | ......... | B60H 1/00064 165/203 |
| 6,266,967 B1 * | 7/2001 | Honda | ................. | B60H 1/3205 62/193 |
| 6,304,803 B1 * | 10/2001 | Dao | .................... | B60H 1/00971 165/140 |
| 6,311,763 B1 * | 11/2001 | Uemura | ............. | B60H 1/00664 165/43 |
| 6,415,857 B1 * | 7/2002 | Nakamura | ......... | B60H 1/0005 165/204 |
| 6,463,998 B1 * | 10/2002 | Shindo | ............... | B60H 1/00028 165/204 |
| 6,491,577 B2 * | 12/2002 | Yoshinori | ............ | B60H 1/3414 165/202 |
| 6,491,578 B2 * | 12/2002 | Yoshinori | .......... | B60H 1/00007 165/203 |
| 6,598,670 B1 * | 7/2003 | Hashimoto | ........ | B60H 1/00028 165/202 |
| 7,013,967 B2 * | 3/2006 | Kondo | ............... | B60H 1/00064 165/203 |
| 7,156,167 B2 * | 1/2007 | Errington | ........... | B60H 1/00007 165/203 |
| 7,793,706 B2 * | 9/2010 | Archibald | .......... | B60H 1/00064 165/202 |
| 7,856,841 B2 * | 12/2010 | Kim | ..................... | B60H 1/3233 165/202 |
| 8,141,622 B2 * | 3/2012 | Kang | ................. | B60H 1/00007 165/202 |
| 8,376,037 B2 * | 2/2013 | Nanaumi | ........... | B60H 1/00064 165/203 |
| 8,633,424 B2 * | 1/2014 | Chernyavsky | ..... | B60H 1/00378 165/202 |
| 2001/0029162 A1 * | 10/2001 | Yoshinori | .......... | B60H 1/00007 454/137 |
| 2003/0102120 A1 | 6/2003 | Henry et al. | | |
| 2004/0031279 A1 * | 2/2004 | Kamiya | ................ | B60H 1/0055 62/244 |
| 2004/0031602 A1 * | 2/2004 | Sugiura | ................ | B60H 1/0075 165/203 |
| 2004/0074248 A1 * | 4/2004 | Tanaka | ................ | B60H 1/00514 62/244 |
| 2004/0079523 A1 * | 4/2004 | Shiraishi | ............ | B60H 1/00735 165/204 |
| 2004/0129007 A1 * | 7/2004 | Tomita | ............... | B60H 1/00064 62/157 |
| 2005/0011640 A1 * | 1/2005 | Tohda | ................ | B60H 1/00007 165/202 |
| 2005/0061498 A1 * | 3/2005 | Tohda | .................... | B60H 1/246 165/204 |
| 2005/0067158 A1 * | 3/2005 | Ito | ...................... | B60H 1/00007 165/204 |
| 2005/0126774 A1 * | 6/2005 | Yamaguchi | ........ | B60H 1/00021 165/204 |
| 2005/0205247 A1 * | 9/2005 | Ezaki | ................. | B60H 1/00028 165/204 |
| 2005/0279489 A1 * | 12/2005 | Kushner | ............ | B60H 1/0005 165/203 |
| 2006/0021424 A1 * | 2/2006 | Ishikawa | ............ | B60H 1/00064 73/114.01 |
| 2006/0175050 A1 * | 8/2006 | Kang | ................. | B60H 1/00064 165/203 |
| 2007/0137833 A1 * | 6/2007 | Kang | ................. | B60H 1/00064 165/42 |
| 2007/0158047 A1 * | 7/2007 | Natsume | ............ | B60H 1/00021 165/43 |
| 2009/0124187 A1 * | 5/2009 | Sievers | ............. | B60H 1/00007 454/75 |
| 2009/0215379 A1 * | 8/2009 | Matsunoo | ........... | B60H 1/0005 454/160 |
| 2011/0005713 A1 * | 1/2011 | Seto | ................... | B60H 1/00028 165/61 |
| 2012/0252340 A1 * | 10/2012 | Gannon | ............. | B60H 1/00028 454/75 |
| 2012/0295529 A1 * | 11/2012 | Fukutomi | ............ | B60H 1/0005 454/152 |
| 2013/0059522 A1 * | 3/2013 | Ota | .................... | B60H 1/00842 454/159 |
| 2013/0232996 A1 * | 9/2013 | Goenka | .................... | B60N 2/56 62/3.61 |
| 2016/0137022 A1 * | 5/2016 | Sakakibara | ........ | B60H 1/00035 165/202 |

FOREIGN PATENT DOCUMENTS

| | | |
|---|---|---|
| KR | 10-2012-0062386 | 6/2012 |
| KR | 10-2012-0138113 | 12/2012 |
| KR | 10-2012-0138928 A | 12/2012 |

* cited by examiner

PRIOR ART

PRIOR ART

PRIOR ART

AIR CONDITIONER FOR VEHICLE AND CONTROLLING METHOD THEREOF

This application is a §371 of International Application No. PCT/KR2014/007829 filed Aug. 22, 2014, and claims priority from Korean Patent Application Nos. 10-2013-0099428 filed Aug. 22, 2013 and 10-2013-0104631 filed Sep. 2, 2013.

BACKGROUND OF THE INVENTION

Field of the Invention

The present invention relates to an air conditioner for a vehicle and a controlling method thereof, and more particularly, to an air conditioner for a vehicle and a controlling method thereof which can variably control a position of a rear seat cold air control door depending on a position of a front seat temperature-adjusting door when the position of the rear seat cold air control door is controlled according to rear seat air-conditioning modes (rear seat temperature-adjusting mode) in an air-conditioning case in which the rear seat cold air control door is mounted on a rear seat air passageway.

Background Art

An air conditioner for a vehicle is a car part, which is installed in a vehicle for the purpose of cooling or heating the interior air of the vehicle in the summer season or the winter season or removing frost from a windshield in the rainy season or the winter season to thereby secure a driver's front and rear visual fields. Such an air conditioner typically includes a heating device and a cooling device together, so that it can heat, cool or ventilate the interior air of the vehicle through the steps of selectively introducing the indoor air or the outdoor air into the air conditioner, heating or cooling the introduced air, and blowing the heated or cooled air into the vehicle.

Such an air conditioner for a vehicle has been developed in various forms according to kinds of vehicles or specifications of the same kind of vehicles, and for instance, there are single zone (front seat space) air conditioners, dual zone (right and left spaces of the front seat) air conditioners, and triple zone (right and left spaces of the front seat and a rear seat space) air conditioners.

FIG. 1 is a sectional view of a conventional single zone air conditioner for a vehicle. In FIG. 1, the air conditioner 1 includes: an air-conditioning case 10 having an air inflow port 11 formed at one side thereof and a defrost vent 12a, a face vent 12b and floor vents 12c formed at the other side thereof in such a way as to be adjusted in degree of opening by mode doors 16a, 16b and 16c; an evaporator 2 and a heater core 3 that are mounted on air passageways in the air-conditioning case 10 in order and are spaced apart from each other at a predetermined interval; and an air blower (not shown) connected to the air inflow port 11 of the air-conditioning case 10 for sending indoor air or outdoor air.

Moreover, the air conditioner further includes a temperature-adjusting door 15 mounted between the evaporator 2 and the heater core 3 for controlling temperature by adjusting the degrees of opening of a cold air passageway P1 bypassing the heater core 3 and of a warm air passageway P2 passing through the heater core 3.

The air-conditioning case 10 includes: an upper case 10a which is composed when a left case and a right case are assembled; and a lower case 10b assembled to a portion of the lower part of the upper case 10a on which the evaporator 2 is seated.

As described above, in the air conditioner 1 for the vehicle, in case of the maximum cooling mode, the temperature-adjusting door 15 opens the cold air passageway P1 and closes the warm air passageway P2. Therefore, the air blown by the air blower exchanges heat with refrigerant flowing inside the evaporator 2 while passing through the evaporator 2 and is changed into cold air. After that, the changed air flows toward a mixing chamber (MC) through the cold air passageway P1, and then, is discharged to the front seat space inside the vehicle through the vents opened by the mode doors 16a, 16b and 16c according to the predetermined air discharge mode, namely, the vent mode, the bi-level mode, the floor mode, the mix mode, or the defrost mode, such that the front seat space is cooled.

Moreover, in the case of the maximum heating mode, the temperature-adjusting door 15 closes the cold air passageway P1 and opens the warm air passageway P2. Accordingly, the air blown by the air blower passes through the evaporator 2, is changed into warm air by exchanging heat with cooling water flowing inside the heater core 3 while passing through the heater core 3 through the warm air passageway P2. After that, the changed air flows toward the mixing chamber (MC) and is discharged to the front seat space inside the vehicle through the vents opened by the mode doors 16a, 16c and 16c according to the predetermined air discharge mode, such that the front seat space is heated.

Furthermore, the dual zone air conditioner includes a separator (not shown) mounted in the middle of the inside of the air-conditioning case 10 to divide the inside of the air-conditioning case 10 into the right and left sides. In this instance, right and left temperature-adjusting doors which are operated individually are respectively mounted at both sides of the separator inside the air-conditioning case 10 to individually control temperature of the right and left spaces of the front seat.

Additionally, the triple zone air conditioner 1a includes a rear seat air passageway 20 formed below a front seat air passageway 17 having cold and warm air passageways P1 and P2 formed inside the dual zone air conditioner. Referring to FIG. 2, the triple zone air conditioner 1a will be described in brief. There is no difference between the dual zone air conditioner and the triple zone air conditioner in that an evaporator 2 and a heater core 3 are mounted inside an air-conditioning case 10, and a front seat temperature-adjusting door 15 and front seat mode doors 16a, 16b and 16c are mounted. However, the triple zone air conditioner 1a further includes: a rear seat air passageway 20 formed below the heater core 3; a rear seat temperature-adjusting door 25 mounted in front of the heater core 3 between the rear seat air passageway 20 and the warm air passageway P2; and an auxiliary rear seat temperature-adjusting door 26 mounted at the rear of the heater core 3.

In addition, the triple zone air conditioner 1a further includes a rear seat air outflow port 21 formed at an outlet of the rear seat air passageway 20 to discharge air to the rear seat.

Therefore, the triple zone air conditioner 1a controls a mixed ratio between cold air which passes the rear seat air passageway 20 by the rear seat temperature-adjusting door 25 and the auxiliary rear seat temperature-adjusting door 26 and warm air which meets the rear seat air passageway 20 after passing through the warm air passageway P2, and then, discharges the mixed air to the rear seat space through the rear seat air outflow port 21 so as to cool and heat even the rear seat space.

As shown in FIG. 2, the conventional triple zone air conditioner 1a mixes warm air passing through the warm air passageway P2 and cold air passing through the rear seat air passageway 20 and discharges the mixed air toward the rear seat to adjust temperature of the rear seat at the time of adjustment of the rear seat temperature that the rear seat temperature-adjusting door 25 opens all of the warm air passageway P2 passing through the heater core 3 and the rear seat air passageway 20. However, in this instance, the conventional triple zone air conditioner 1a has several disadvantages in that the triple zone air conditioner provides unsatisfactory rear seat temperature control, it is difficult to secure linearity of temperature discharged to the rear seat and it deteriorates passengers' comfort because a relatively large amount of cold air volume passes the rear seat air passageway 20 due to ventilation resistance of the heater core 3 at the side of the warm air passageway P2.

Moreover, the triple zone air conditioner 1a further includes a rear seat temperature-adjusting switch (not shown) mounted at the rear seat space so that the passenger can adjust temperature of the rear seat and control the rear seat temperature-adjusting door 25.

FIG. 3 is a graph showing discharge temperature depending on outdoor air temperature by positions (air-conditioning modes) of the rear seat temperature-adjusting switch. In FIG. 3, the rear seat temperature-adjusting switch can carry out total five air-conditioning modes, such as the maximum cooling mode, the cooling mode, the intermediate mode (temperature-adjusting mode), the heating mode and the maximum heating mode, according to manipulation positions, and discharge temperatures by the air-conditioning modes are shown in the graph of FIG. 3.

In FIG. 3, the three dotted line boxes show a discharge temperature range in the front seat heating mode, a discharge temperature range in the front seat intermediate mode, and a discharge temperature range in the front seat cooling mode.

As shown in FIG. 3, the conventional triple zone air conditioner 1a can make the rear seat in the maximum heating mode through the rear seat temperature-adjusting switch even though the front seat is in the cooling mode, and in this instance, a temperature difference between the front seat and the rear seat is very large.

As described above, the conventional air conditioner continuously supplies warm air or cold air to the rear seat unless someone manipulates the rear seat temperature-adjusting switch when a passenger on the rear seat gets out of the vehicle after manipulating the rear seat temperature-adjusting switch into the maximum heating mode or the maximum cooling mode because the rear seat temperature-adjusting door 25 is controlled just by the rear seat temperature-adjusting switch regardless of the position of the front seat temperature-adjusting door 15.

In this instance, if warm air is continuously supplied to the rear seat space while the front seat is cooled, the conventional air conditioner has several disadvantages in that warm air of the rear seat influences on the front seat to deteriorate comfort of the passenger who sits on the front seat and in that temperature of the inside of the vehicle rises due to the warm air supplied to the rear seat so as to increase an operation section of the air conditioner.

SUMMARY OF THE INVENTION

Accordingly, the present invention has been made to solve the above-mentioned problems occurring in the prior arts, and it is an object of the present invention to provide an air conditioner for a vehicle and a controlling method thereof which can variably control a position of a rear seat cold air control door depending on a position of a front seat temperature-adjusting door when the position of the rear seat cold air control door is controlled according to rear seat air-conditioning modes (rear seat temperature-adjusting modes) in an air-conditioning case in which the rear seat cold air control door is mounted on a rear seat air passageway, thereby distributing an optimal cold air volume to the front seat air passageway and the rear seat air passageway by preventing that a large volume of cold air is supplied to the rear seat air passageway in the rear seat temperature-adjusting mode, removing dissatisfaction in control of rear seat temperature, and securing linearity of temperature discharged to the rear seat to enhance passengers' comfort.

It is another object of the present invention to provide an air conditioner for a vehicle and a controlling method thereof which can control a position of the rear seat temperature-adjusting door in connection with a position of the front seat temperature-adjusting door when the rear seat temperature is adjusted through manipulation of the rear seat temperature-adjusting switch so that there is no large difference between the rear seat discharge temperature and the front seat discharge temperature, thereby enhancing not only comfort of the passenger who sits on the front seat but also comfort of the passenger who sits on the rear seat by minimizing an influence of the rear seat discharge temperature on the front seat, and enhancing a fuel consumption ratio by reducing an operation degree of the air conditioner.

To accomplish the above object, according to the present invention, there is provided an air conditioner for a vehicle which includes: an air-conditioning case which has a front seat air passageway having cold and warm air passageways and a rear seat air passageway formed below the front seat air passageway; an evaporator mounted at the upstream side of the front seat air passageway and the rear seat air passageway and a heater core mounted on the warm air passageway inside the air-conditioning case; and a front seat temperature-adjusting door mounted between the evaporator and the heater core inside the air-conditioning case to adjust the degrees of opening of the cold air passageway P1 and the warm air passageway, the air conditioner further including: a rear seat discharge housing which is disposed at an outlet of the rear seat air passageway of the air-conditioning case and has a rear seat face vent and rear seat floor vents to discharge air toward the rear seat; a rear seat temperature-adjusting door which is mounted on the rear seat air passageway and controls an amount of air passing the evaporator which is flown into the rear seat air passageway and the warm air passageway; a rear seat cold air control door which is mounted inside the rear seat air passageway to control the degree of opening of the rear seat air passageway; and a control part for controlling a position of the rear seat cold air control door depending on a position of the front seat temperature-adjusting door when the position of the rear seat cold air control door is controlled according to rear seat air-conditioning modes.

In another aspect of the present invention, there is provided a controlling method of the air conditioner for a vehicle including: a first step of judging whether the rear seat air-conditioning mode is a rear seat maximum cooling mode, a rear seat maximum heating mode, a rear seat off mode or a rear seat temperature-adjusting mode; a second step of operating the rear seat cold air control door toward the position that opens the rear seat air passageway to the maximum if the rear seat air-conditioning mode is the rear seat maximum cooling mode as a judgement result of the first step; a third step of operating the rear seat cold air control door toward the position that closes the rear seat air passageway if the rear seat air-conditioning mode is the rear seat maximum heating mode or the rear seat off mode as the judgment result of the first step; and a fourth step of varying the position of the rear seat cold air control door depending on the position of the front seat temperature-adjusting door if the rear seat air-conditioning mode is the rear seat temperature-adjusting mode as the judgment result of the first step.

The air conditioner for a vehicle and the controlling method thereof according to the present invention can variably control a position of a rear seat cold air control door depending on a position of a front seat temperature-adjusting door when the position of the rear seat cold air control door is controlled according to rear seat air-conditioning modes (rear seat temperature-adjusting modes) in an air-conditioning case in which the rear seat cold air control door is mounted on a rear seat air passageway, thereby distributing an optimal cold air volume to the front seat air passageway and the rear seat air passageway by preventing that a large volume of cold air is supplied to the rear seat air passageway in the rear seat temperature-adjusting mode, removing dissatisfaction in control of rear seat temperature, and securing linearity of temperature discharged to the rear seat to enhance passengers' comfort.

Additionally, the air conditioner for a vehicle and the controlling method thereof according to the present invention can control the position of the rear seat temperature-adjusting door in connection with the position of the front seat temperature-adjusting door when the rear seat temperature is adjusted through manipulation of the rear seat temperature-adjusting switch so that there is no large difference between the rear seat discharge temperature and the front seat discharge temperature, thereby enhancing not only comfort of the passenger who sits on the front seat but also comfort of the passenger who sits on the rear seat by minimizing an influence of the rear seat discharge temperature on the front seat.

In addition, the air conditioner for a vehicle and the controlling method thereof according to the present invention can prevent that temperature inside the vehicle rises by the rear seat discharge temperature and reduce the operation degree of the air conditioner to enhance the fuel consumption ratio because the rear seat discharge temperature is controlled within the range that there is no large difference between the rear seat discharge temperature and the front seat discharge temperature.

BRIEF DESCRIPTION OF THE DRAWINGS

The above and other objects, features and advantages of the present invention will be apparent from the following detailed description of the preferred embodiments of the invention in conjunction with the accompanying drawings, in which.

DETAILED DESCRIPTION OF THE PREFERRED EMBODIMENT

Figure 1:
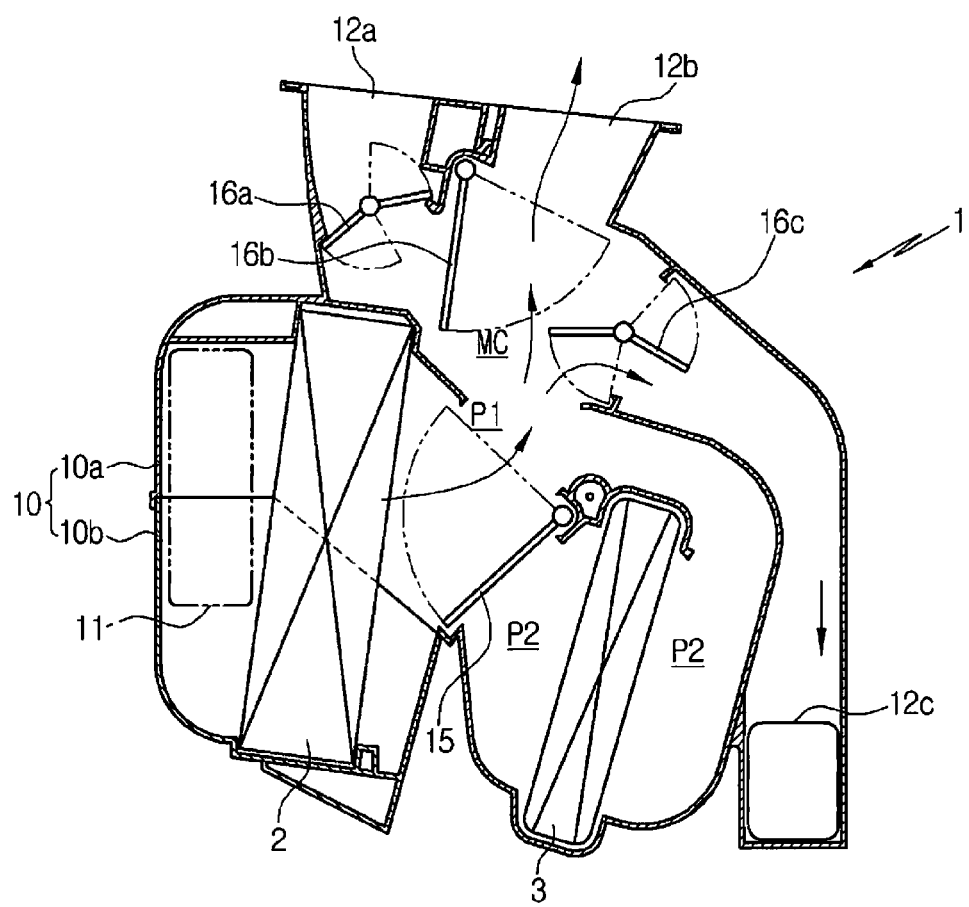
FIG. 1 is a sectional view of a conventional single zone air conditioner.
Figure 2:
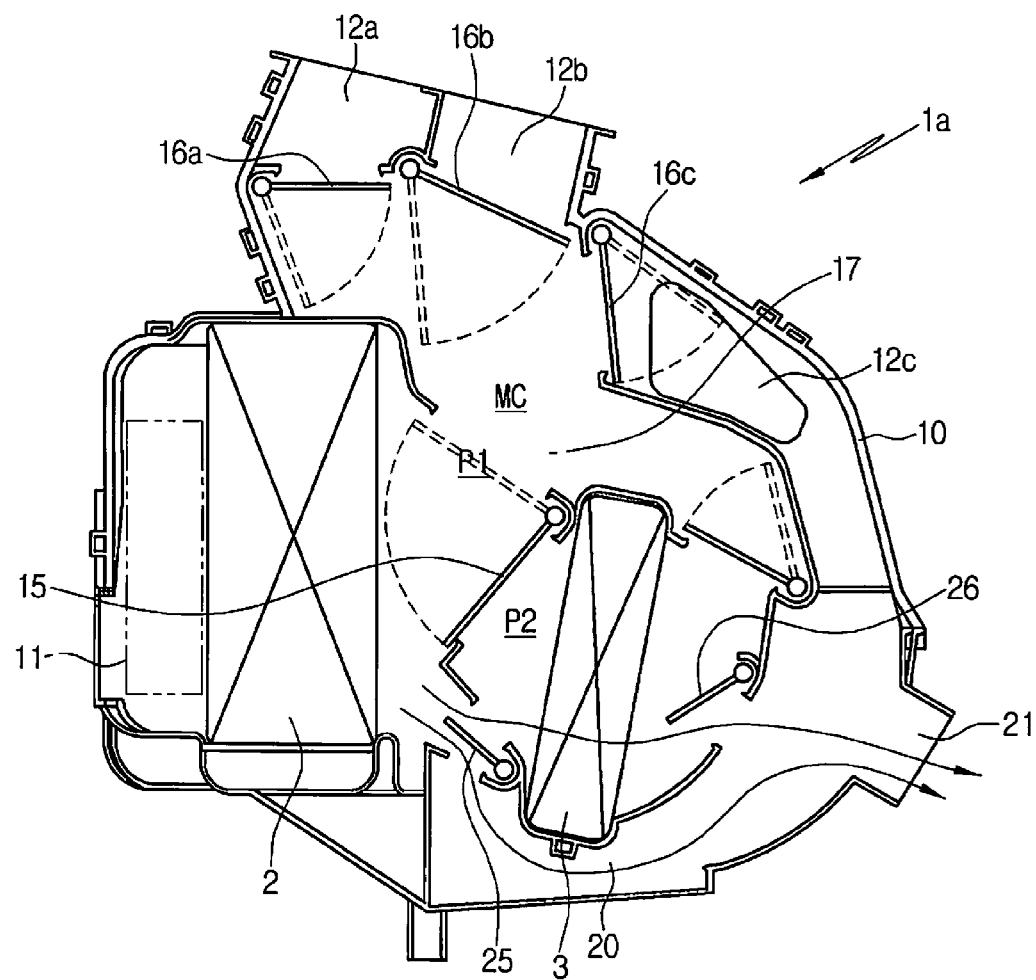
FIG. 2 is a sectional view of a conventional triple zone air conditioner.
Figure 3:
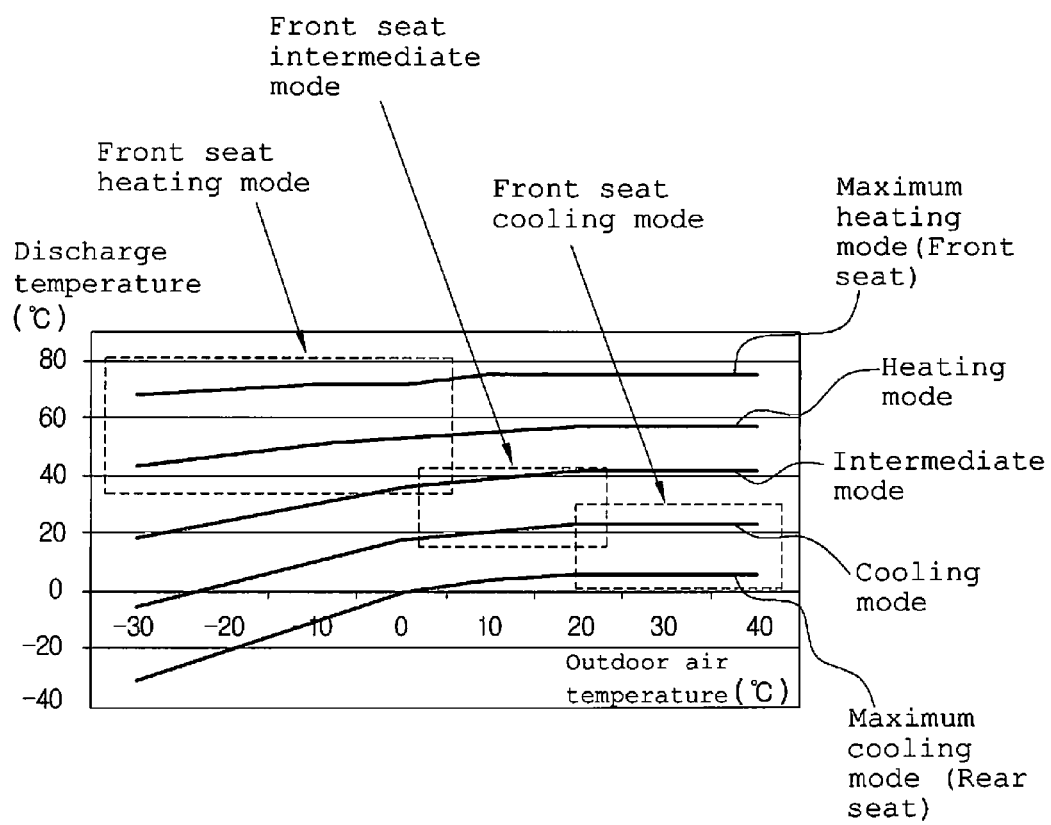
FIG. 3 is a graph showing discharge temperatures depending on outdoor air temperature by positions (air-conditioning modes) of a rear seat temperature-adjusting switch of a conventional air conditioner.
Figure 4:
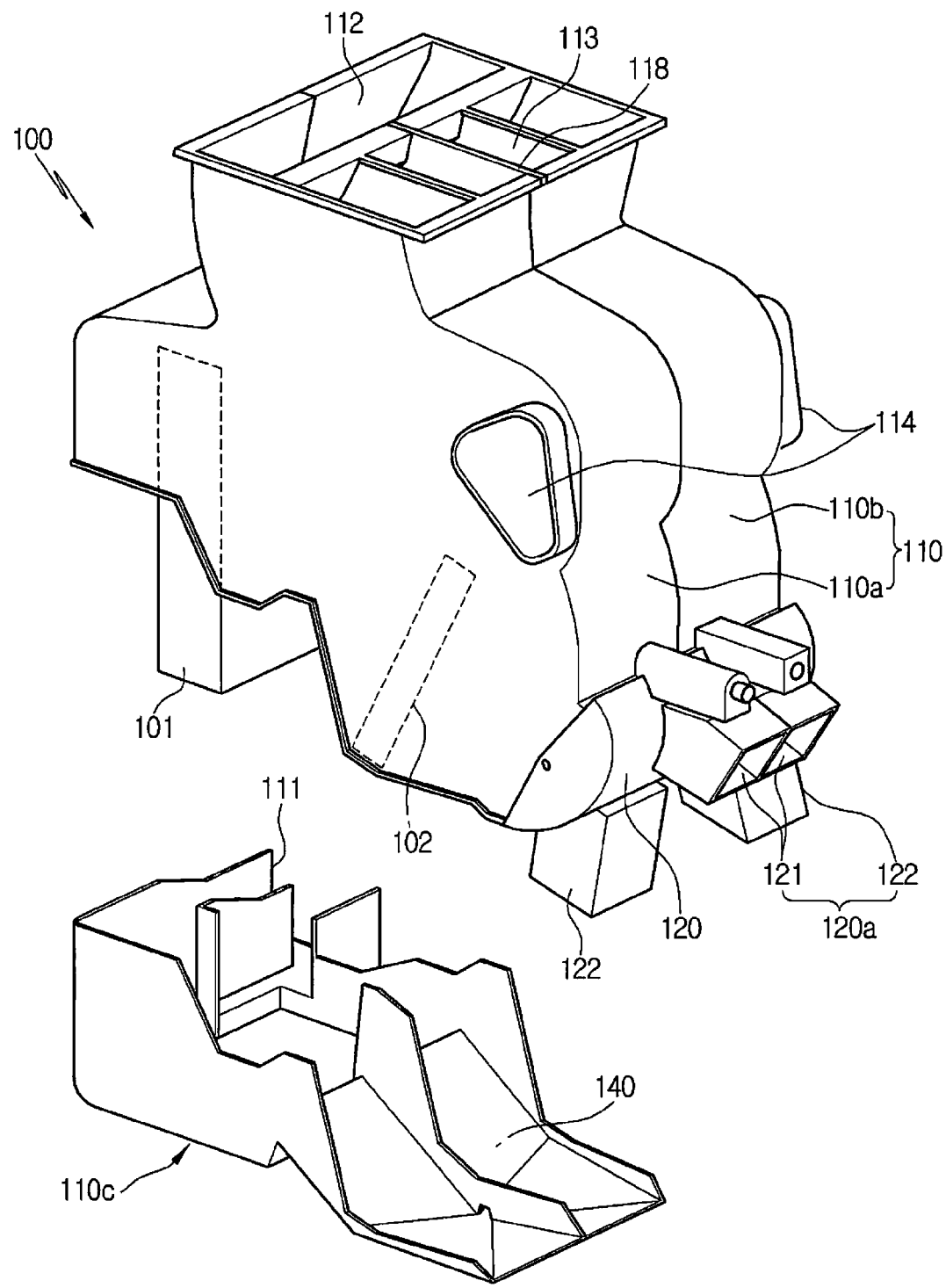
FIG. 4 is a perspective view of an air conditioner for a vehicle according to the present invention.
Figure 5:
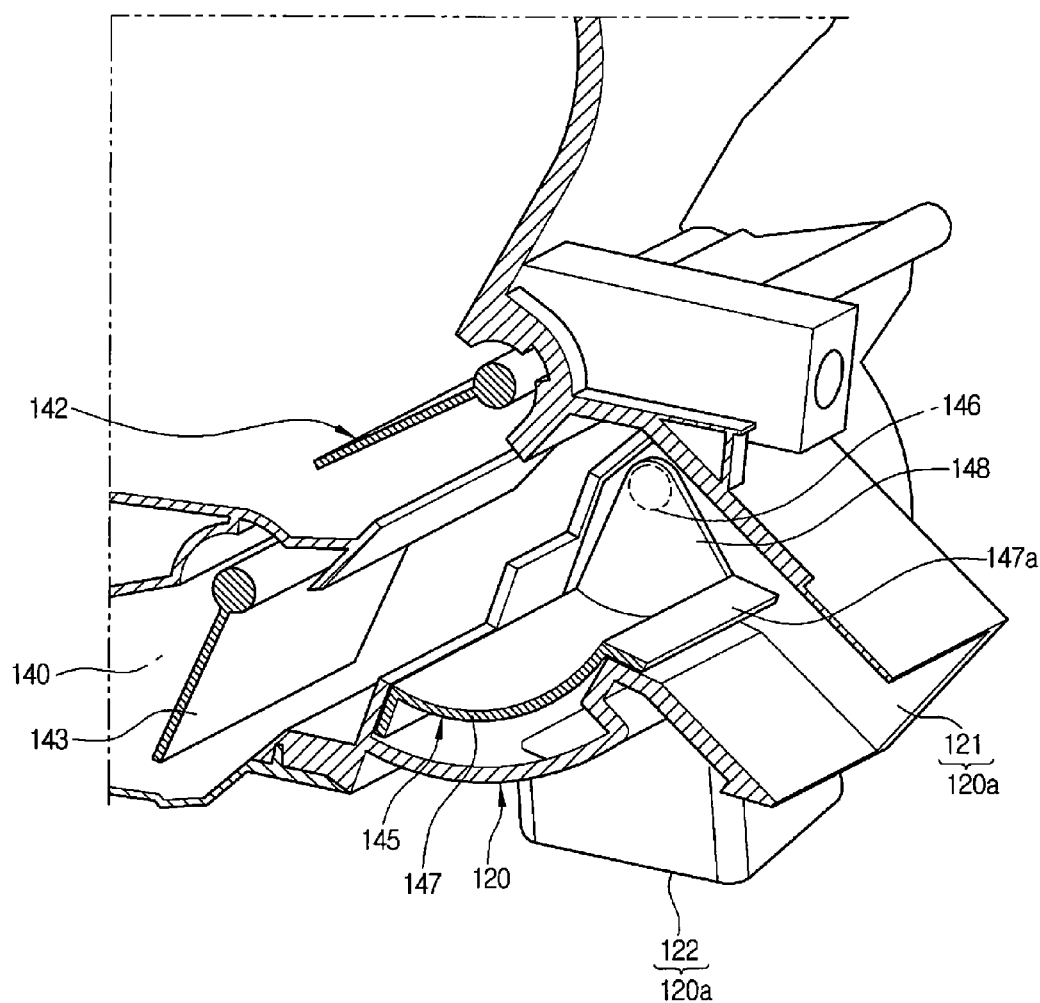
FIG. 5 is a sectional perspective view showing a discharge housing of the air conditioner for a vehicle according to the present invention.

Hereinafter, reference will be now made in detail to the preferred embodiment of the present invention with reference to the attached drawings.

As shown in the drawings, an air conditioner 100 for a vehicle according to a preferred embodiment of the present invention includes: an air-conditioning case 110 having an air inflow port 111 formed on one side, a plurality of front seat air outflow ports formed on the other side (outlet side), and a front seat air passageway 105 having cold and warm air passageways P1, P2 and P3 and a rear seat air passageway 140 formed below the front seat air passageway 105 inside the air-conditioning case 110; an evaporator 101 mounted at the upstream side of the front seat air passageway 105 and the rear seat air passageway 140 and a heater core 102 mounted on the warm air passageway P2 inside the air-conditioning case 110; and a front seat temperature-adjusting door 115 mounted between the evaporator 101 and the heater core 102 to adjust the degrees of opening of the cold air passageway P1 which bypasses the heater core 102 and the warm air passageways P2 and P3 which passes the heater core 102.

The air-conditioning case 110 includes: right and left cases 110a and 110b which are assembled to each other; and a lower case 110c which is assembled integrally to the lower parts of the right and left cases 110a and 110b.

Moreover, the air-conditioning case 110 has a separator 118 which divides the inside of the air-conditioning case 110 into right and left sides so that the air conditioner can individually control temperatures of right and left spaces of the front seat and right and left spaces of the rear seat.

Furthermore, a mixing chamber (MC) where cold air passing the cold air passageway P1 and warm air passing the warm air passageways P2 and P3 are mixed together is formed at the upstream side of the front seat air outflow ports.

In the meantime, the warm air passageways P2 and P3 are formed in the shape of alphabet "U" which goes by way of the heater core 102, and an inlet P2 of the warm air passageway is branched from the cold air passageway P1 and an outlet P3 of the warm air passageway is communicated with the mixing chamber (MC).

Therefore, the air introduced to the inlet P2 of the warm air passageway flows toward the mixing chamber (MC) through the outlet P3 of the warm air passageway after passing the heater core 102. In this instance, a partition wall 119 is formed between the inlet P2 and the outlet P3 of the warm air passageway to partition air of the inlet P2 of the warm air passageway and air of the outlet P3 of the warm air passageway.

The partition wall 119 is formed at the top of the heater core 102, and in more detail, extends from the top of the heater core 102 to a rotary shaft of the front seat temperature-adjusting door 115.

Furthermore, an air blower (not shown) which blows indoor air or outdoor air to the inside of the air-conditioning case 110 is mounted at the air inflow port 111 of the air-conditioning case 110.

The front seat air outflow ports include a defrost vent 112 for discharging air toward the front window of the vehicle, a face vent 113 for discharging air toward the face of a passenger who sits on the front seat and floor vents 114 for discharging air toward the feet of the passenger who sits on the front seat in order.

Additionally, the vents 112 to 114 are opened and closed by a plurality of front seat mode doors 116 to be controlled in degree of opening.

Meanwhile, a partition wall 117 is formed between the outlet P3 of the warm air passageway and the floor vents 114 so that the air flowing toward the outlet P3 of the warm air passageway and the air flowing toward the floor vents 114 are divided by the partition wall 117.

In addition, the evaporator 101 stands adjacent to the air inflow port 111 of the air-conditioning case 110 which is the upstream side of the front seat air passageway 105 and the rear seat air passageway 140, and the heater core 102 stands at the warm air passageways P2 and P3.

In the meantime, the evaporator 101 and the heater core 102 may be vertically mounted inside the air-conditioning case 110, but may be inclined at a predetermined angle as shown in the drawing.

Not shown in the drawings, but a compressor, a condenser and an expansion valve are connected to the evaporator 101 through a refrigerant pipe to form a refrigeration cycle so that air passing the evaporator 101 is cooled. Moreover, the heater core 102 is connected with an engine through a cooling water pipe to circulate cooling water heated by the engine to the heater core 102 so that the air passing the heater core 102 is heated.

Of course, in electric vehicles or hybrid vehicles, an electric heater instead of the heater core 102 may be mounted.

Moreover, the front seat temperature-adjusting door 115 includes: a rotary shaft mounted between the evaporator 101 and the heater core 102 inside the air-conditioning case 110; a first door part 115a which is formed at one side based on the rotary shaft to control the degrees of opening of the cold air passageway P1 and the inlet P2 of the warm air passageway; and a second door part 115b which is formed at the other side based on the rotary shaft to control the degree of opening of the outlet P3 of the warm air passageway.

Therefore, in the maximum cooling mode, when the first door part 115a opens the cold air passageway P1 and closes the inlet P2 of the warm air passageway and the second door part 115b closes the outlet P3 of the warm air passageway, the front seat temperature-adjusting door 115 prevents that the air inside the warm air passageway heated by the heater core 102 flows toward the mixing chamber MC.

Furthermore, in the maximum heating mode, the first door part 115a closes the cold air passageway P1 and opens the inlet P2 of the warm air passageway and the second door part 115b opens the outlet P3 of the warm air passageway.

Additionally, the rear seat air passageway 140 is formed below the front seat air passageway 105 inside the air-conditioning case 110.

The rear seat air passageway 140 is divided from the warm air passageways P2 and P3 by the partition wall 144 and individually carries out rear seat air-conditioning by supplying air to the rear seat space through a console box (not shown) inside the vehicle.

An inlet of the rear seat air passageway 140 is formed to communicate with a downstream side (rear side) passageway of the evaporator 101, an outlet of the rear seat air passageway 140 communicates with a rear seat discharge housing 120 which will be described later, and the rear seat discharge housing 120 is connected with the console box (not shown) inside the vehicle through a duct (not shown).

Moreover, a plurality of air outflow ports 120a are formed at the rear seat discharge housing 120 formed at the outlet of the rear seat air passageway 140 to discharge air toward the rear seat.

The air outflow ports 120a includes: a rear seat face vent 121 for discharging air toward the face of the passenger who sits on the rear seat; and rear seat floor vents 122 for discharging air toward the feet of the passenger who sits on the rear seat.

The rear seat face vent 121 is formed at the width direction center of the rear seat discharge housing 120, and the rear seat floor vents 122 are respectively formed at both ends of the width direction of the rear seat discharge housing 120. The rear seat face vent 121 and the rear seat floor vents 122 are formed at different angles based on a rotational center of the rear seat mode door 145.

That is, on the outer circumferential surface of the rear seat discharge housing 120, the rear seat face vent 121 is formed to communicate in the direction of three o'clock based on the rotary shaft 146 of the rear seat mode door 145 and the rear seat floor vents 122 are formed to communicate in the direction of six o'clock based on the rotary shaft 146 of the rear seat mode door 145.

Additionally, the rear seat mode door 145 which controls the degrees of opening of the rear seat face vent 121 and the rear seat floor vents 122 which are the air outflow ports 120a according to the rear seat air discharge mode is rotatably mounted inside the rear seat discharge housing 120.

Here, the rear seat mode door 145 is a rotary type door and includes: rotary shafts 146 which are respectively mounted on both sides opposed to each other inside the rear seat discharge housing 120 to be able to rotate; a dome plate 147 which is spaced apart from the rotary shaft 146 at a predetermined interval in the radial direction and has sealing walls 147a formed at both end portions in the rotational direction to control the degrees of opening of the rear seat face vent 121 and the rear seat floor vents 122; and a pair of side plates 148 for connecting both end portions of the dome plate 147 with the rotary shafts 146.

Furthermore, the partition wall 144 which partitions the warm air passageways P2 and P3 and the rear seat air passageway 140 includes: a warm air inlet 135 for communicating a front warm air passageway of the heater core 102 with the rear seat air passageway 140; and a warm air outlet 136 for communicating the rear seat discharge housing 120 with a rear warm air passageway of the heater core 102.

In other words, the inlet of the rear seat air passageway 140 is communicated with the warm air passageway P2 through the rear passageway of the evaporator 101 and the warm air inlet 135.

Moreover, a rear seat temperature-adjusting door 141 which controls inflow amounts of the air, which passes the evaporator 101, into the rear seat air passageway 140 and the warm air passageway P2 to adjust temperature of the rear seat space is mounted on the rear seat air passageway 140 inside the air-conditioning case 110. An auxiliary rear seat temperature-adjusting door 142 is mounted at the rear of the heater core 102 inside the air-conditioning case 110 to control an inflow amount of the air, which passes the heater core 102, into the rear seat discharge housing 120.

In more detail, the rear seat temperature-adjusting door 141 is mounted at the warm air inlet 135 of the front of the heater core 102 to control the degrees of opening of the rear seat air passageway 140 and the warm air inlet 135. Therefore, the rear seat temperature-adjusting door 141 controls a mixed amount of warm air which passes the heater core 102 through the warm air inlet 135 and the warm air outlet 136 and cold air which bypasses the heater core 102 through the rear seat air passageway 140.

Furthermore, the auxiliary rear seat temperature-adjusting door 142 is mounted at one side of the warm air outlet 136 of the rear of the heater core 102 to control the degree of the opening of the warm air outlet 136. Therefore, the auxiliary rear seat temperature-adjusting door 142 supplies some of the warm air, which passes the heater core 102, to the rear seat discharge housing 120.

In the meantime, the auxiliary rear seat temperature-adjusting door 142 is connected with the rear seat temperature-adjusting door 141 via a link (not shown) to interlock with the rear seat temperature-adjusting door 141.

Additionally, a rear seat cold air control door 143 is mounted inside the rear seat air passageway 140 to control the degree of opening of the rear seat air passageway 140.

The rear seat temperature-adjusting door 141, the auxiliary rear seat temperature-adjusting door 142 and the rear seat cold air control door 143 are all flat type doors, that is, each of them includes a rotary shaft rotatably mounted on the inner side of the air-conditioning case 110 and a plate formed on the outer circumferential surface of the rotary shaft in a flat plate type.

In addition, in order to control the position of the rear seat cold air control door 143 according to the rear seat air-conditioning modes, a control part 150 which variably control the position of the rear seat cold air control door 143 depending on the position of the front seat temperature-adjusting door 115 is disposed.

Figure 6:
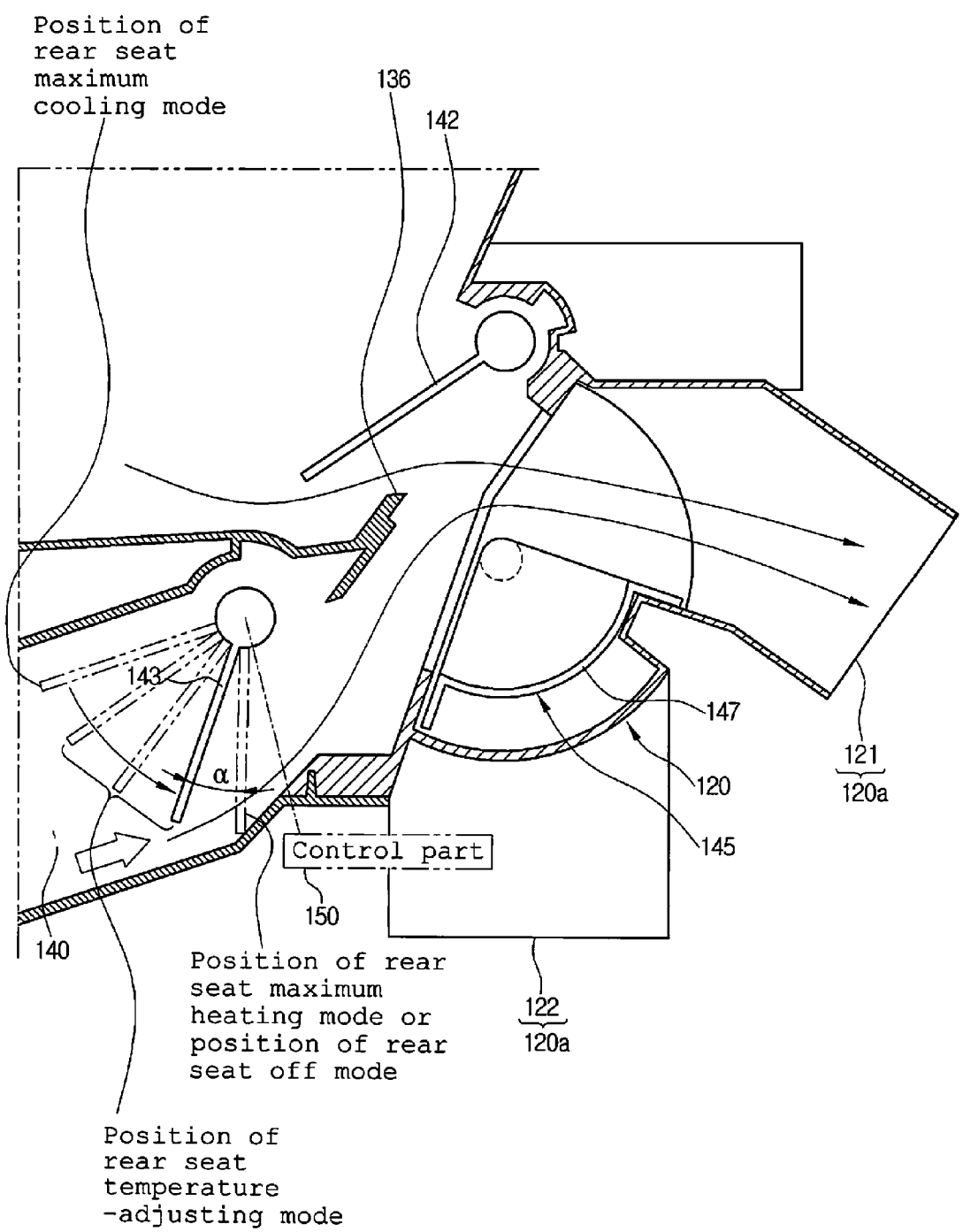
FIG. 6 is a side sectional view of FIG. 5.

As shown in FIG. 6, in the rear seat temperature-adjusting mode out of the rear seat air-conditioning modes, the control part 150 operates the rear seat cold air control door 143 toward one of plural operation positions of the rear seat cold air control door 143 which has been previously set depending on the position of the front seat temperature-adjusting door 115.

Moreover, the control part 150 operates the rear seat cold air control door 143 toward the position that opens the rear seat air passageway 140 to the maximum in the rear seat maximum cooling mode out of the rear seat air-conditioning modes, but operates the rear seat cold air control door 143 toward the position that closes the rear seat air passageway 140 in the rear seat maximum heating mode (or in the rear seat off mode).

Now, the rear seat temperature-adjusting mode will be described. In order to adjust temperature of the rear seat, the rear seat temperature-adjusting door 141 opens all of the warm air inlet 135 and the rear seat air passageway 140 to control the mixed amount of the cold air and the warm air, and in this instance, a relative large volume of cold air goes to the rear seat air passageway 140 due to ventilation resistance of the heater core 102 at the side of the warm air passageway P2.

Particularly, the cold air amount distributed to the cold air passageway P1, the warm air passageways P2 and P3 and the rear seat air passageway 140 is changed depending on the position (the degree of opening) of the front seat temperature-adjusting door 115.

That is, in the front seat maximum cooling mode, because the front seat temperature-adjusting door 115 closes the warm air passageways P2 and P3, the cold air passing the evaporator 101 is distributed toward the cold air passageway P1 and the rear seat air passageway 140. In this instance, if the front seat temperature-adjusting door 115 is fixed at the position of the front seat maximum cooling mode, because the change in cold air amount distributed to the rear seat air passageway 140 is small, the air conditioner is good in temperature control of the rear seat and can secure linearity of temperature discharged to the rear seat.

On the contrary, in the front seat maximum heating mode, because the front seat temperature-adjusting door 115 closes the cold air passageway P1, the cold air passing the evaporator 101 is distributed to the warm air passageways P2 and P3 and the rear seat air passageway 140. In this instance, if the front seat temperature-adjusting door 115 is fixed at the position of the front seat maximum heating mode, because lots of cold air amount passes through the rear seat air passageway 140 due to ventilation resistance of the heater core 102 at the side of the warm air passageways P2 and P3, the air conditioner is not good in temperature control of the rear seat and it is difficult to secure linearity of temperature discharged to the rear seat.

As described above, even though the front seat temperature-adjusting door 115 is fixed at the position of the front seat maximum heating mode, the air conditioner is not good in temperature control of the rear seat because lots of cold air amount passes through the rear seat air passageway 140 due to ventilation resistance of the heater core 102. Therefore, if the position of the front seat temperature-adjusting door 115 is changed, the air conditioner becomes worse in temperature control of the rear seat and it is more difficult to secure linearity of temperature discharged to the rear seat.

Therefore, the control part 150 does not make the rear seat cold air control door 143 open the rear seat air passageway 140 to the maximum but operates the rear seat cold air control door 143 toward one of plural operation positions of the rear seat cold air control door 143 which has been previously set depending on the position of the front seat temperature-adjusting door 115.

In other words, in the rear seat temperature-adjusting mode, the rear seat cold air control door 143 gives resistance to the rear seat air passageway 140 as much as the ventilation resistance of the heater core 102 to prevent that the relatively large amount of cold air passes the rear seat air passageway 140, thereby removing dissatisfaction in rear seat temperature control and enhancing the passenger's comfort by securing linearity of temperature discharged to the rear seat.

Referring to FIG. 6, the rear seat cold air control door 143 has total five operation positions, namely, at the position of the rear seat maximum cooling mode to open the rear seat air passageway 140 to the maximum, at the position of the rear seat maximum heating mode to close the rear seat air passageway 140, and at the position that the rear seat cold air control door 143 varies depending on the position of the front seat temperature-adjusting door 115 in the rear seat temperature-adjusting mode.

In the drawing, in the rear seat temperature-adjusting mode, the operation positions to vary the rear seat cold air control door 143 depending on the position of the front seat temperature-adjusting door 115 are three, but the rear seat cold air control door 143 may have more than three operation positions.

Furthermore, in the rear seat temperature-adjusting mode, the control part 150 controls the rear seat cold air control door 143 to a position that the degree of opening of the rear seat air passageway 140 is reduced when the position of the front seat temperature-adjusting door 115 is changed to a position that the degree of opening of the cold air passageway P1 is reduced.

In other words, the rear seat cold air control door 143 reduces the degree of opening of the rear seat air passageway 140 to increase ventilation resistance of the rear seat air passageway 140 as the front seat temperature-adjusting door 115 opens the warm air passageways P2 and P3 largely.

Figure 7:
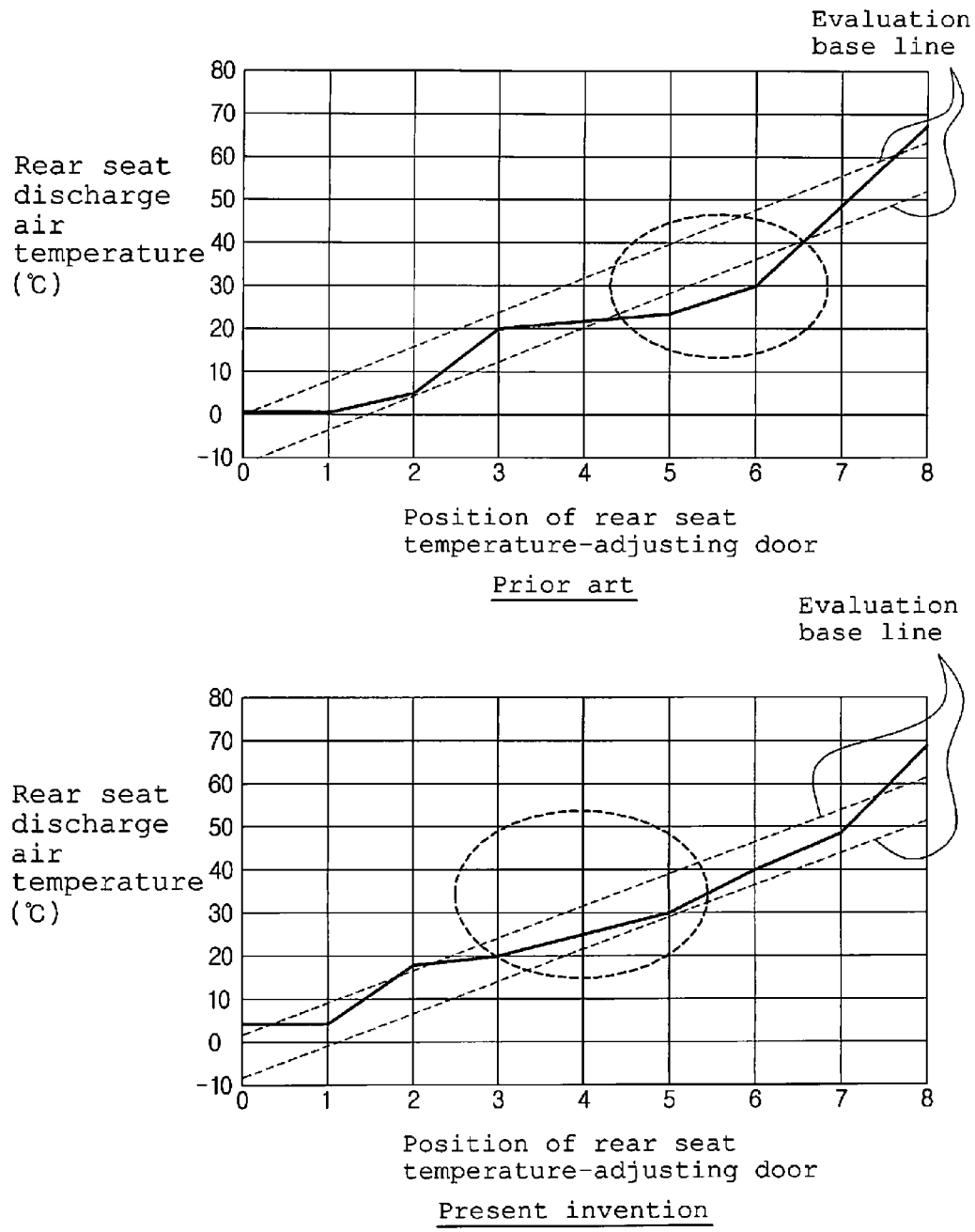
FIG. 7 is a graph showing comparison of rear seat discharge temperature depending on positions of a rear seat temperature-adjusting door of the present invention with that of the rear seat temperature-adjusting switch of the conventional air conditioner.

FIG. 7 is a graph showing comparison of rear seat discharge temperature depending on positions of a rear seat temperature-adjusting door of the present invention with that of the rear seat temperature-adjusting switch of the conventional air conditioner. In the graph, the evaluation base line is a section that the passenger who sits on the rear seat can feel comfort.

In the graph, at the time of the rear seat temperature control, in the case of the conventional air conditioner, a relatively large amount of cold air goes toward the rear seat air passageway 140 due to ventilation resistance of the heater core 102, and hence, the rear seat discharge air temperature drops below the evaluation base line in a specific position (temperature-adjusting range) of the rear seat temperature-adjusting door 141 which is indicated by a dotted circle in FIG. 7.

On the contrary, in the present invention, at the time of the rear seat temperature control, because the position of the rear seat cold air control door 143 is variably controlled depending on the position of the front seat temperature-adjusting door 115, the rear seat discharge air temperature is within the evaluation base line.

Furthermore, at the time of the rear seat temperature control, the control part 150 operates the rear seat cold air control door 143 toward one of plural operation positions of the rear seat cold air control door 143 which has been previously set depending on the position of the front seat temperature-adjusting door 115 and the position of the rear seat temperature-adjusting door 141.

That is, at the time of the rear seat temperature control, the control part 150 can control the position of the rear seat cold air control door 143 depending on the position of the front seat temperature-adjusting door 115 by judging only the position of the front seat temperature-adjusting door 115 or controls the position of the rear seat cold air control door 143 depending on the position of the front seat temperature-adjusting door 115 and the rear seat temperature-adjusting door 141 by judging the positions of the front seat temperature-adjusting door 115 and the rear seat temperature-adjusting door 141.

In the case that the positions of the front seat temperature-adjusting door 115 and the rear seat temperature-adjusting door 141 are all judged, the rear seat cold air control door 143 which has been previously set is operated depending on the positions of the front seat temperature-adjusting door 115 and the rear seat temperature-adjusting door 141.

As an example, in a case that the position of the front seat temperature-adjusting door 115 is changed to reduce the degree of opening of the cold air passageway P1 and the position of the rear seat temperature-adjusting door 141 is changed to reduce the degree of opening of the rear seat air passageway 140, the control part 150 operates the rear seat cold air control door 143 to a position to reduce the degree of opening of the rear seat air passageway 140.

Additionally, a rear seat temperature-adjusting switch (not shown) may be mounted in the rear seat space to control the rear seat temperature-adjusting door 141. As described above, when the rear seat temperature-adjusting switch is mounted, the passenger can directly control temperature of the rear seat by manipulating the rear seat temperature-adjusting switch.

The rear seat temperature-adjusting switch can carry out total five air-conditioning modes, such as the maximum cooling mode, the cooling mode, the intermediate mode (temperature-adjusting mode), the heating mode and the maximum heating mode according to manipulation positions. Of course, the five air-conditioning modes can be changed.

Therefore, when the passenger who sits on the rear seat manipulates the rear seat temperature-adjusting switch to select one of the five air-conditioning mode, the rear seat temperature-adjusting door 141 controls the degrees of opening of the rear seat air passageway 140 and the warm air inlet 135 to adjust temperature of the air discharged to the rear seat.

Moreover, when the rear seat temperature is adjusted through manipulation of the rear seat temperature-adjusting switch, the control part controls the position of the rear seat temperature-adjusting door 141 in connection with the position of the front seat temperature-adjusting door 115.

That is, when the passenger manipulates the rear seat temperature-adjusting switch, the control parts checks the position of the front seat temperature-adjusting door 115 and controls the position of the rear seat temperature-adjusting door 141 depending on the position of the front seat temperature-adjusting door 115.

In more detail, at the time of the rear seat temperature control through manipulation of the rear seat temperature-adjusting switch, the control part restricts the upper limit and the lower limit of the operation positions of the rear seat temperature-adjusting door 141 depending on the position of the front seat temperature-adjusting door 115 and controls the position of the rear seat temperature-adjusting door 141 within the restricted operation range to carry out rear seat temperature control.

The front seat temperature-adjusting door 115 is varied in position to control temperature of the front seat while rotating by a predetermined angle from the position of the maximum cooling mode to open the cold air passageway P1 and close the warm air passageways P2 and P3 to the position of the maximum heating mode to open the warm air passageways P2 and P3 and close the cold air passageway P1.

The rear seat temperature-adjusting door 141 is varied in position to control temperature of the rear seat while rotating by a predetermined angle from the position of the maximum cooling mode to open the rear seat air passageway 140 and close the warm air inlet 135 to the position of the maximum heating mode to open the warm air inlet 135 and close the rear seat air passageway 140.

Here, the maximum operation range of the rear temperature-adjusting door 141 is from the position to close the rear seat air passageway 140 to the position to close the warm air inlet 135.

In the conventional air conditioner, the position of the rear seat temperature-adjusting door is controlled within the maximum operation range when the passenger manipulates the rear temperature-adjusting switch. However, in the air conditioner according to the present invention, the rear temperature-adjusting door 141 is restricted in operation range depending on the position of the front seat temperature-adjusting door 115.

In other words, the front seat temperature-adjusting door 115 may be located in the cooling mode, in the intermediate mode (temperature-adjusting mode), or in the heating mode. As an example, supposing that the front seat temperature-adjusting door 115 is located in the cooling mode, when the passenger manipulates the rear seat temperature-adjusting switch, the rear seat temperature-adjusting door 141 is restricted in the operation range not to be far from the position of the rear seat cooling mode so that a difference between the rear seat discharge temperature and the front seat discharge temperature is not large.

That is, in the state where the front seat temperature-adjusting door 115 is located in the cooling mode, when the passenger manipulates the rear seat temperature-adjusting switch to select the rear seat maximum heating mode, the control part does not control the rear seat temperature-adjusting door 141 to be at the position of the maximum heating mode but controls the rear seat temperature-adjusting door 141 to be in the mode (for instance, the intermediate mode or the heating mode) having temperature lower than that of the maximum heating mode so that the difference between the rear seat discharge temperature and the front seat discharge temperature is not large.

As described above, when the passenger manipulates the rear seat temperature-adjusting switch to control temperature of the rear seat, the position of the rear seat temperature-adjusting door 141 is set depending on the position of the front seat temperature-adjusting door 115, and in this instance, the operation range of the rear seat temperature-adjusting door 141 is restricted in connection with the position of the front seat temperature-adjusting door 115 in such a way that the difference between the rear seat discharge temperature and the front seat discharge temperature is not large so that the air conditioner according to the present invention can enhance not only comfort of the passenger who sits on the front seat but also comfort of the passenger who sits on the rear seat by minimizing an influence of the rear seat discharge temperature on the front seat.

Furthermore, because the rear seat discharge temperature is within the range that the difference between the rear seat discharge temperature and the front seat discharge temperature is not large, the air conditioner according to the present invention can prevent that temperature inside the vehicle rises due to the rear seat discharge temperature and reduce an operation range of the air conditioner so as to enhance a fuel consumption ratio.

Figure 8:
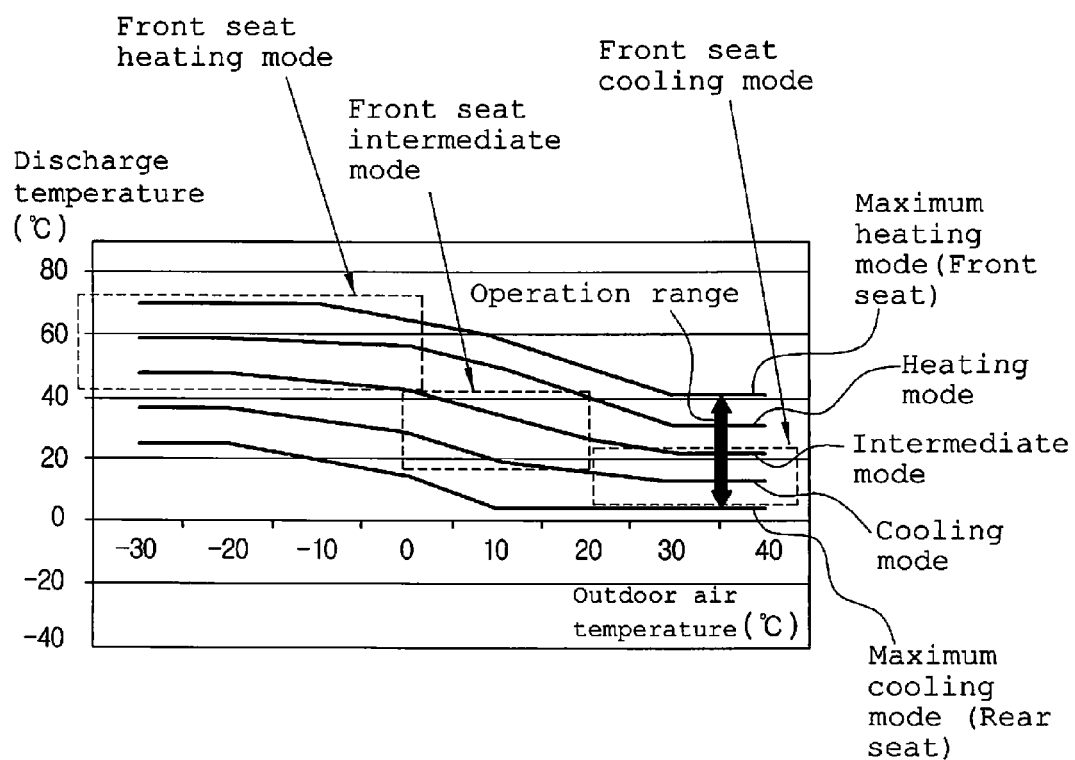
FIG. 8 is a graph showing discharge temperature depending on outdoor temperature by positions (air-conditioning modes) of the rear seat temperature-adjusting switch of the air conditioner for a vehicle according to the present invention.

FIG. 8 is a graph showing discharge temperature depending on outdoor temperature by positions (air-conditioning modes) of the rear seat temperature-adjusting switch of the air conditioner for a vehicle according to the present invention. The rear seat temperature-adjusting switch can carry out total five air-conditioning modes, such as the maximum cooling mode, the cooling mode, the intermediate mode, the heating mode and the maximum heating mode according to manipulation positions, and discharge temperature by each air-conditioning mode is shown in the graph of FIG. 8.

In FIG. 8, the three dotted boxes are a discharge temperature range in the front seat heating mode, a discharge temperature range in the front seat intermediate mode (temperature-adjusting mode), and a discharge temperature range in the front seat cooling mode.

As an example, in FIG. 8, when the front seat is in the cooling mode, the five air-conditioning modes may be carried out at the rear seat through the rear seat temperature-adjusting switch. In this instance, the rear seat discharge temperatures in the rear seat maximum cooling mode, the cooling mode and the intermediate mode are controlled within the front seat discharge temperature range, and the rear seat discharge temperatures in the rear seat heating mode and the maximum heating mode get out of the front seat temperature range but the difference between the rear seat discharge temperature and the front seat discharge temperature is not large.

That is, even though the passenger manipulates the rear seat temperature-adjusting switch to select the rear seat heating mode and the maximum heating mode, because the position of the rear seat temperature-adjusting door 141 is controlled in connection with the position of the front seat temperature-adjusting door 115, the difference between the rear seat discharge temperature and the front seat discharge temperature is not large in the rear seat heating mode and the maximum heating mode.

In the meantime, the control part controls the rear seat mode door 145 depending on the position of the rear seat temperature-adjusting switch to change the rear seat air discharge mode. That is, the control part changes the rear seat air discharge mode into a rear seat floor mode when the rear seat discharge temperature is high and changes into the rear seat vent mode when the rear seat discharge temperature is low so as to enhance rear seat comfort.

Of course, the control part can select the rear seat air discharge mode according to the front seat air discharge mode.

Figure 12:
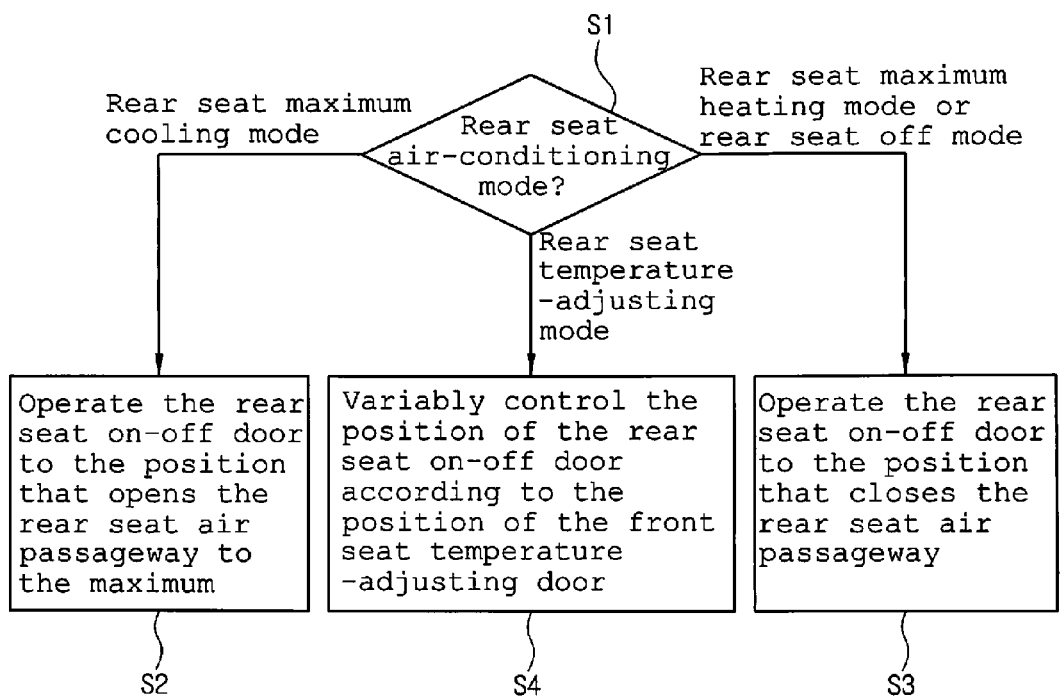
FIG. 12 is a flow chart showing a controlling method of the air conditioner for a vehicle according to the present invention.

Hereinafter, referring to FIG. 12, a controlling method of the air conditioner for a vehicle according to the present invention will be described.

First, a first step (S1) of judging whether the rear seat air-conditioning mode is the rear seat maximum cooling mode, the rear seat maximum heating mode, the rear seat off mode or the rear seat temperature-adjusting mode is carried out.

As a judgement result of the first step (S1), if the rear seat air-conditioning mode is the rear seat maximum cooling mode, a second step (S2) of operating the rear seat cold air control door 143 toward the position that opens the rear seat air passageway 140 to the maximum is carried out.

As the judgment result of the first step (S1), if the rear seat air-conditioning mode is the rear seat maximum heating mode or the rear seat off mode, a third step (S3) of operating the rear seat cold air control door 143 toward the position that closes the rear seat air passageway 140 is carried out.

As the judgment result of the first step (S1), if the rear seat air-conditioning mode is the rear seat temperature-adjusting mode, a fourth step (S4) of varying the position of the rear seat cold air control door 143 depending on the position of the front seat temperature-adjusting door 115 is carried out.

As described above, because the relatively large amount of cold air passes through the rear seat air passageway 140 due to ventilation resistance of the heater core 102 at the side of the warm air passageway P2 in the rear seat temperature-adjusting mode, the rear seat cold air control door 143 gives resistance to the rear seat air passageway 140 as much as the ventilation resistance of the warm air passageway P2 so as to reduce the cold air amount passing through the rear seat air passageway 140.

Here, in the fourth step (S4), the rear seat cold air control door 143 is operated toward one of the plural operation positions of the rear seat cold air control door 143 which has been previously set depending on the position of the front seat temperature-adjusting door 115.

In FIG. 6, the operation positions of the rear seat cold air control door 143 are total five, namely, one at the position of the rear seat maximum cooling mode to open the rear seat air passageway 140 to the maximum, one at the position of the rear seat maximum heating mode to close the rear seat air passageway 140, and three at operation positions that the rear seat cold air control door 143 are varied according to the front seat temperature-adjusting door 115 in the rear seat temperature-adjusting mode.

Furthermore, in the fourth step (S4), when the position of the front seat temperature-adjusting door 115 is changed to a position to reduce the degree of opening of the cold air passageway P1, the position of the rear seat cold air control door 143 is changed to the position, which reduces the degree of opening of the rear seat air passageway 140, out of the plural operation positions.

In other words, the rear seat cold air control door 143 reduces the degree of opening of the rear seat air passageway 140 when the front seat temperature-adjusting door 115 opens the warm air passageways P2 and P3 more, so that the ventilation resistance of the rear seat air passageway 140 is increased.

Hereinafter, operations of the air conditioner for the vehicle according to the present invention will be described.

Description of general air discharge modes, namely, the defrost mode, the vent mode, the bi-level mode, the floor mode and the mix mode, will be omitted, and just the front seat maximum cooling mode, the rear seat maximum cooling mode, the front seat maximum heating mode, the rear seat maximum heating mode, the front seat temperature-adjusting mode and the rear seat temperature-adjusting mode will be described.

A. Front Seat Maximum Cooling Mode and the Rear Seat Maximum Cooling Mode (See FIG. 9)

Figure 9:
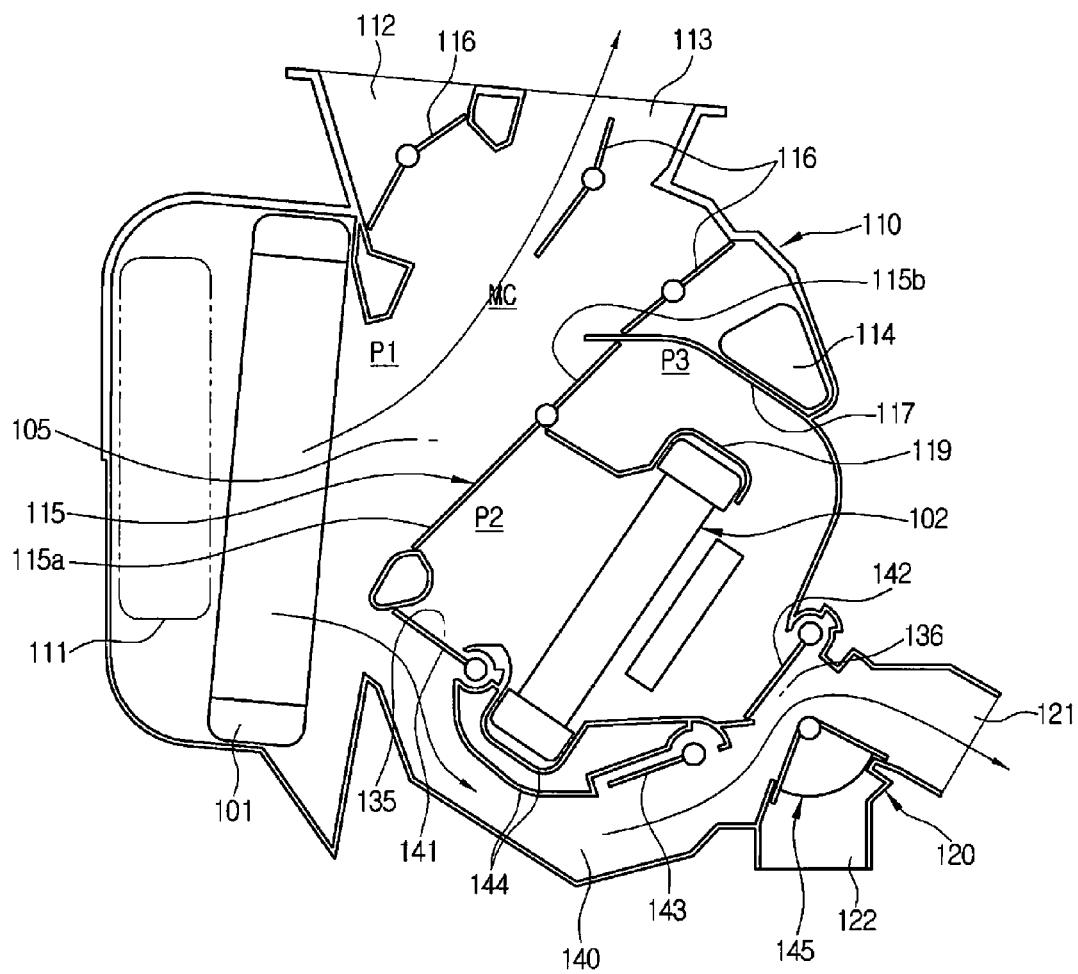
FIG. 9 is a sectional view showing a front seat maximum cooling mode and a rear seat maximum cooling mode of the air conditioner for a vehicle according to the present invention.

In the front seat maximum cooling mode and the rear seat maximum cooling mode, as shown in FIG. 9, in order to cool the front seat, the front seat temperature-adjusting door 115 opens the cold air passageway P1 and closes the inlet P2 and the outlet P3 of the warm air passageway.

Moreover, in order to cool the rear seat, the rear seat cold air control door 143 opens the rear seat air passageway 140, the rear seat temperature-adjusting door 141 closes the warm air inlet 135, and the auxiliary rear seat temperature-adjusting door 142 closes the warm air outlet 136.

In the meantime, the rear seat mode door 145 closes the rear seat floor vents 122.

Furthermore, when the air conditioner is operated, cold refrigerant circulates the evaporator 101.

Therefore, the air blown into the air-conditioning case 110 through the air blower is changed into cold air while passing the evaporator 101, and then, some of the cold air is discharged to the front seat air outflow ports through the cold air passageway P1 to cool the front seat space, and some of the cold air is discharged toward the face of the rear seat passenger through the rear seat air passageway 140 and the rear seat face vent 121 to cool the rear seat space.

B. Front Seat Maximum Heating Mode and the Rear Seat Maximum Heating Mode (See FIG. 10)

Figure 10:
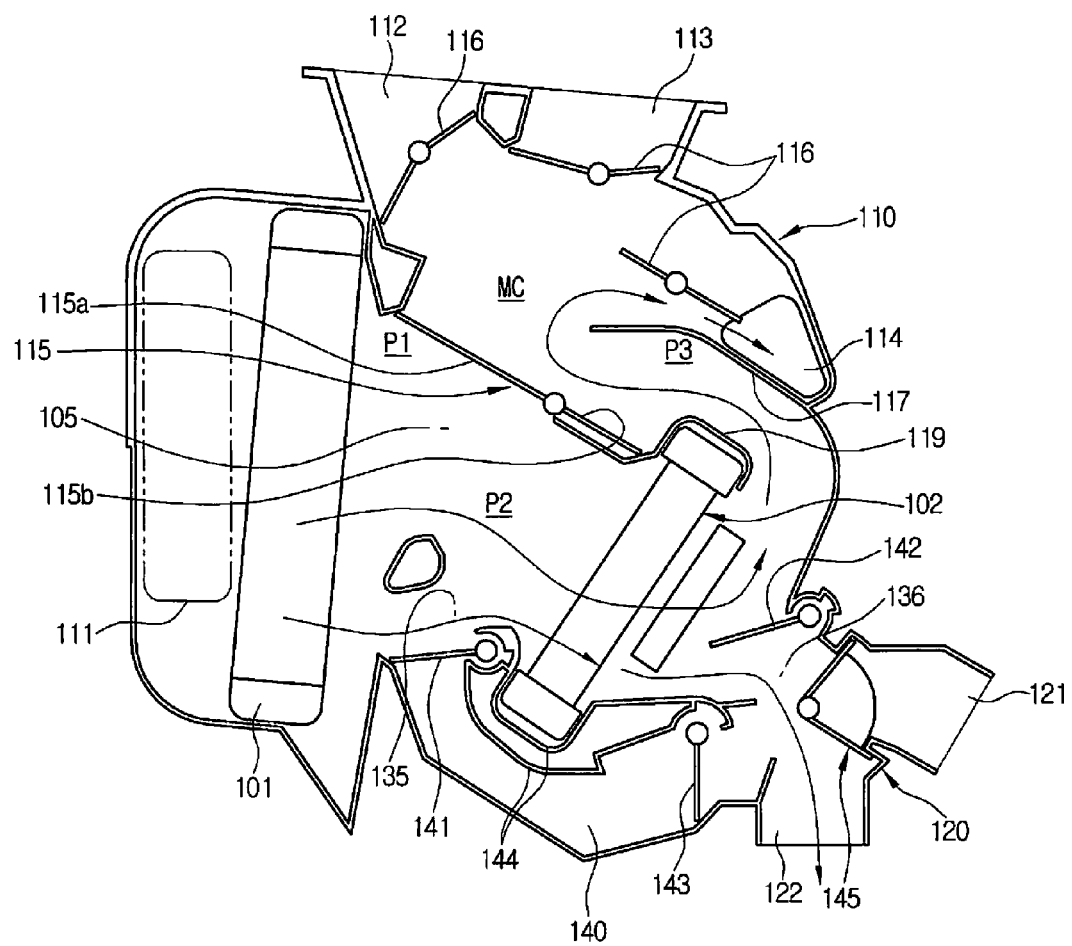
FIG. 10 is a sectional view showing a front seat maximum heating mode and a rear seat maximum heating mode of the air conditioner for a vehicle according to the present invention.

In the front seat maximum heating mode and the rear seat maximum heating mode, as shown in FIG. 10, in order to heat the front seat, the front seat temperature-adjusting door 115 closes the cold air passageway P1 and opens the inlet P2 and the outlet P3 of the warm air passageway.

Moreover, in order to heat the rear seat, the rear seat cold air control door 143 closes the rear seat air passageway 140, the rear seat temperature-adjusting door 141 opens the warm air inlet 135, and the auxiliary rear seat temperature-adjusting door 142 opens the warm air outlet 136.

In the meantime, the rear seat mode door 145 closes the rear seat face vent 121.

Furthermore, when the air conditioner is stopped, hot engine cooling water circulates the heater core 102.

Therefore, the air blown into the air-conditioning case 110 through the air blower passes the evaporator 101. Some of the air passing the evaporator 101 is changed into warm air while passing the heater core 102 through the warm air passageways P2 and P3 and is discharged to the front seat air outflow ports to heat the front seat space.

Some of the air passing the evaporator 101 is introduced into an inlet of the rear seat air passageway 140, and then, is introduced into the warm air passageway through the warm air inlet 135. After that, the air is changed into warm air while passing the heater core 102 and is discharged to the rear seat discharge housing 120 at the outlet of the rear seat air passageway 140 through the warm air outlet 136, and then, is discharged toward the feet of the rear seat passenger through the rear seat floor vents 122 to heat the rear seat space.

C. Front Seat Temperature-Adjusting Mode and Rear Seat Temperature-Adjusting Mode (See FIG. 11)

Figure 11:
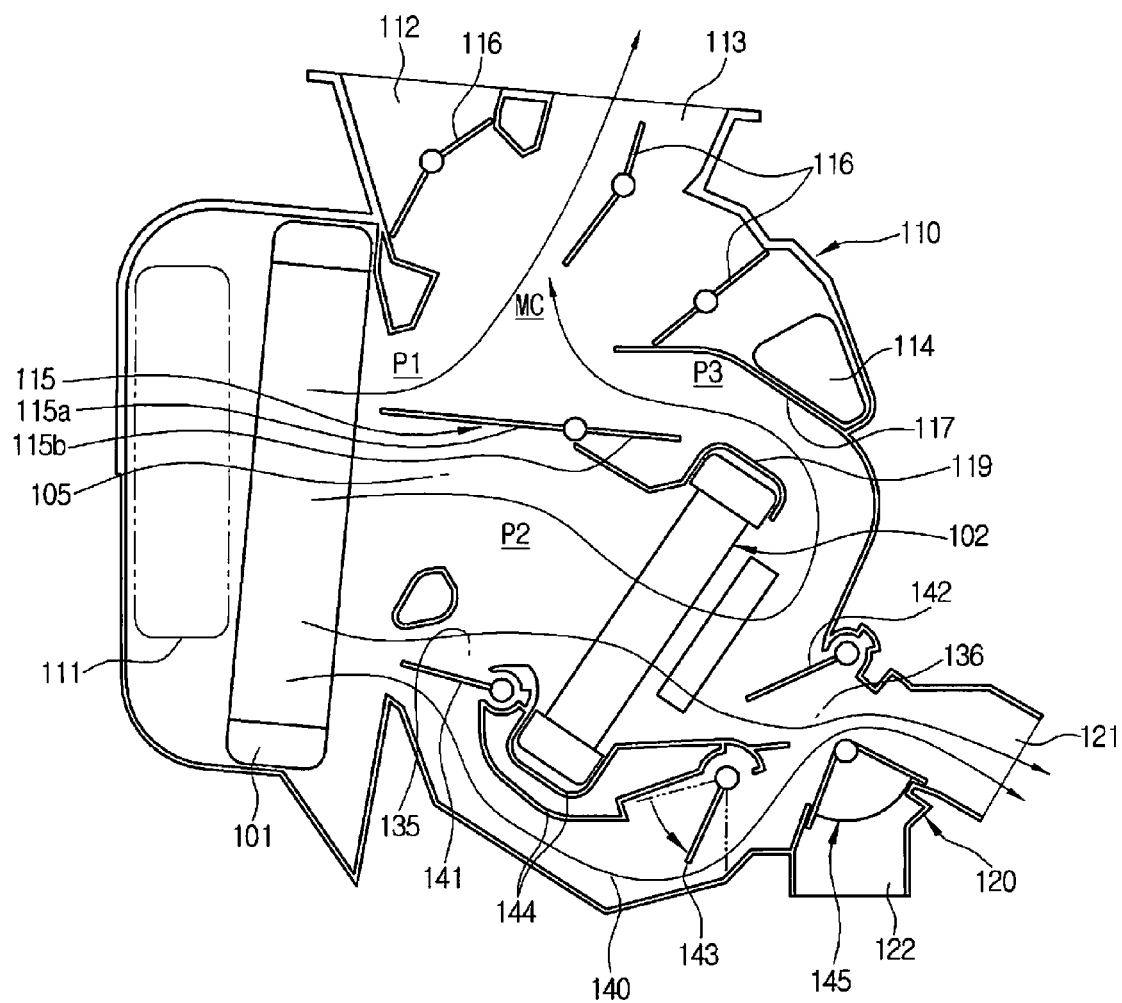
FIG. 11 is a sectional view showing a front seat temperature-adjusting mode and a rear seat temperature-adjusting mode of the air conditioner for a vehicle according to the present invention.

In the front seat temperature-adjusting mode and rear seat temperature-adjusting mode, as shown in FIG. 11, in order to control the front seat at proper temperature, the front seat temperature-adjusting door 115 opens all of the cold air passageway P1 and the inlet P2 and the outlet P3 of the warm air passageway.

In order to control the rear seat at proper temperature, the rear seat temperature-adjusting door 141 opens all of the rear seat air passageway 140 and the warm air inlet 135, and the auxiliary rear seat temperature-adjusting door 142 opens the warm air outlet 136.

Additionally, the rear seat cold air control door 143 is variably operated to one of the plural operation positions of the rear seat cold air control door 143 which has been previously set depending on the position of the front seat temperature-adjusting door 115.

Of course, when the position of the front seat temperature-adjusting door 115 is changed, the position of the rear seat cold air control door 143 is also changed in response to the change in position of the front seat temperature-adjusting door 115.

Meanwhile, the rear seat mode door 145 closes the rear seat floor vents 122, but it may be changed according to the air discharge modes.

In addition, when the air conditioner is operated, cold refrigerant circulates the evaporator 101, and hot engine cooling water circulates the heater core 102.

Therefore, the air blown into the air-conditioning case 110 through the air blower is changed into cold air while passing the evaporator 101. Some of the air passing the evaporator 101 flows into the mixing chamber (MC) through the cold air passageway P1, and some of the cold air is changed into warm air while passing the heater core 102 through the warm air passageways P2 and P3, flows to the mixing chamber (MC) and is discharged to the front seat air outflow ports after being mixed with the cold air in the mixing chamber (MC) so that the front seat space is controlled at proper temperature.

Moreover, some of the cold air passing the evaporator 101 is introduced into the inlet of the rear seat air passageway 140. Some of the cold air introduced into the inlet of the rear seat air passageway 140 flows toward the rear seat discharge housing 120 through the rear seat air passageway 140 and some of the cold air is changed into warm air while passing the heater core 102 through the warm air inlet 135, flows toward the rear seat discharge housing 120 through the warm air outlet 136 and is supplied to the console box after being mixed with the cold air in the rear seat discharge housing 120 so that the rear seat space is controlled at proper temperature.

In the above process, because the ventilation resistance is applied to the warm air passageway P2 by the heater core 102 and is applied to the rear seat air passageway 140 by the rear seat cold air control door 143, the ventilation resistances are in balance. Accordingly, because it is prevented that the relatively large amount of cold air passes the rear seat air passageway 140, the air conditioner for the vehicle according to the present invention removes the passenger's dissatisfaction in control of rear seat temperature, secures linearity of rear seat discharge temperature, and enhances the passenger's comfort.

Furthermore, when the passenger manipulates the rear seat temperature-adjusting switch to change the rear seat air-conditioning mode, the position of the rear seat temperature-adjusting door 141 is changed. In this instance, the control part selects the position of the rear seat temperature-adjusting door 141 depending on the position of the front seat temperature-adjusting door 115 and restricts the operation range of the rear seat temperature-adjusting door 141 so that the difference between the rear seat discharge temperature and the front seat discharge temperature is not large.

What is claimed is:

1. An air conditioner for a vehicle which includes: an air-conditioning case which has a front seat air passageway having cold and warm air passageways and a rear seat air passageway formed below the front seat air passageway; an evaporator mounted at the upstream side of the front seat air passageway and the rear seat air passageway and a heater core mounted on the warm air passageway inside the air-conditioning case; and a front seat temperature-adjusting door mounted between the evaporator and the heater core inside the air-conditioning case to adjust the degrees of opening of the cold air passageway and the warm air passageway, the air conditioner comprising:
    a rear seat discharge housing which is disposed at an outlet of the rear seat air passageway of the air-conditioning case and has a rear seat face vent and rear seat floor vents to discharge air toward the rear seat;
    a rear seat temperature-adjusting door which is mounted on the rear seat air passageway and controls an amount of air that has passed the evaporator and is flowing into the rear seat air passageway and the warm air passageway;
    a rear seat cold air control door which is mounted inside the rear seat air passageway to control the degree of opening of the rear seat air passageway; and
    a control part for controlling a position of the rear seat cold air control door depending on a position of the front seat temperature-adjusting door when the position of the rear seat cold air control door is controlled according to rear seat air-conditioning modes,
    wherein an auxiliary rear seat temperature-adjusting door is mounted at the rear side of the heater core inside the air-conditioning case to control an inflow amount of air flowing into the rear seat discharge housing after passing the heater core.

2. The air conditioner according to claim 1, wherein the control part operates the rear seat cold air control door toward one of plural operation positions of the rear seat cold air control door which has been previously set depending on the position of the front seat temperature-adjusting door in the rear seat temperature-adjusting mode.

3. The air conditioner according to claim 2, wherein the control part controls the rear seat cold air control door to operate toward the position, which reduces the degree of opening of the rear seat air passageway, of the plural operation positions when the position of the front seat temperature-adjusting door is changed to the position which reduces the degree of opening of the cold air passageway.

4. The air conditioner according to claim 1, wherein the control part operates the rear seat cold air control door toward the position that opens the rear seat air passageway to the maximum in the rear seat maximum cooling mode, and operates the rear seat cold air control door toward the position that closes the rear seat air passageway in the rear seat maximum heating mode.

5. The air conditioner according to claim 1, wherein the control part operates the rear seat cold air control door toward one of plural operation positions of the rear seat cold air control door which has been previously set depending on the position of the front seat temperature-adjusting door and the position of the rear seat temperature-adjusting door in the rear seat temperature-adjusting mode.

6. The air conditioner according to claim 1, further comprising:
    a rear seat temperature-adjusting switch which controls the rear seat temperature-adjusting door to control rear seat temperature,
    wherein the control part controls the position of the rear seat temperature-adjusting door in connection with the position of the front seat temperature-adjusting door when a passenger manipulates the rear seat temperature-adjusting door to control temperature of the rear seat.

7. The air conditioner according to claim 6, wherein the control part restricts the upper limit and the lower limit of the operation positions of the rear seat temperature-adjusting door depending on the position of the front seat temperature-adjusting door and controls the position of the rear seat temperature-adjusting door within the restricted operation range to carry out rear seat temperature control.

8. The air conditioner according to claim 6, wherein a rear seat mode door is mounted inside the rear seat discharge housing to control the degrees of opening of the rear seat face vent and the rear seat floor vents.

9. The air conditioner according to claim 8, wherein the control part controls the rear seat mode door according to the position of the rear seat temperature-adjusting switch to change a rear seat air discharge mode.

\* \* \* \* \*